GAY P. GAULIEN
MILTON A. KRASKA
INVENTORS

BY J. R. Faulkner
O. B. Johnson
ATTORNEYS 3,162,281
GLASS RUN GUIDE
Milton A. Kraska, Dearborn, and Gay P. Gaulien, Southfield, Mich., assignors to Ford Motor Company, Dearborn, Mich., a corporation of Delaware
Filed Jan. 2, 1963, Ser. No. 248,928
7 Claims. (Cl. 189—72)

This invention relates to means for supporting and guiding slidable windows.

In particular, this invention relates to a novel window assembly comprising a glass run guide fixed to a window glass and extending into a glass run channel and into slidable contact with a liner therein comprising a pliable organic polymeric material having a low coefficient of friction in contact with said guide.

More particularly, this invention relates to improved means for guiding and supporting slidable windows in motor vehicles such as convertibles and "hardtops" in which only a single channel and guide assembly is available to guide and support the slidable window in the upper positions assumed in its vertical movements, the improved means being constructed and arranged to provide sufficient fore and aft stability to the window to permit the use of a single arm window regulator.

As a rule, sliding glasses mounted on the bodies of motor vehicles are guided and supported throughout their height, during their sliding movement, both upwards and downwards, by fore and aft slideways consisting broadly of channel sections lined internally with a soft surface material and fitted generally in fillusters of a door frame or other body section. Removal of either fore or aft support above the bottom edge of the window opening in the door or body structure necessarily increases the problems attendant to maintaining fore and aft stability of the glass. Furthermore, the need for means to provide such stability independent of the window regulator assembly is accentuated when a single arm window regulator is used.

One object of this invention is, therefore, to provide in a slidable window assembly a glass run guide fixed to a window glass and including guide means which extend into slidable contact with a pliable surface providing low frictional resistance within a glass run channel having retention means which coact with the guide means to prevent withdrawal of such guide means from the channel in a direction longitudinally of such window and to provide such glass with sufficient fore and aft stability to permit the use of a single arm window regulator.

Other features and objects of this invention will appear in the following description and appended claims, reference being had to the accompanying drawing forming a part of this specification wherein like reference characters designate corresponding parts in the several views.

Figures 1, 2, 3:
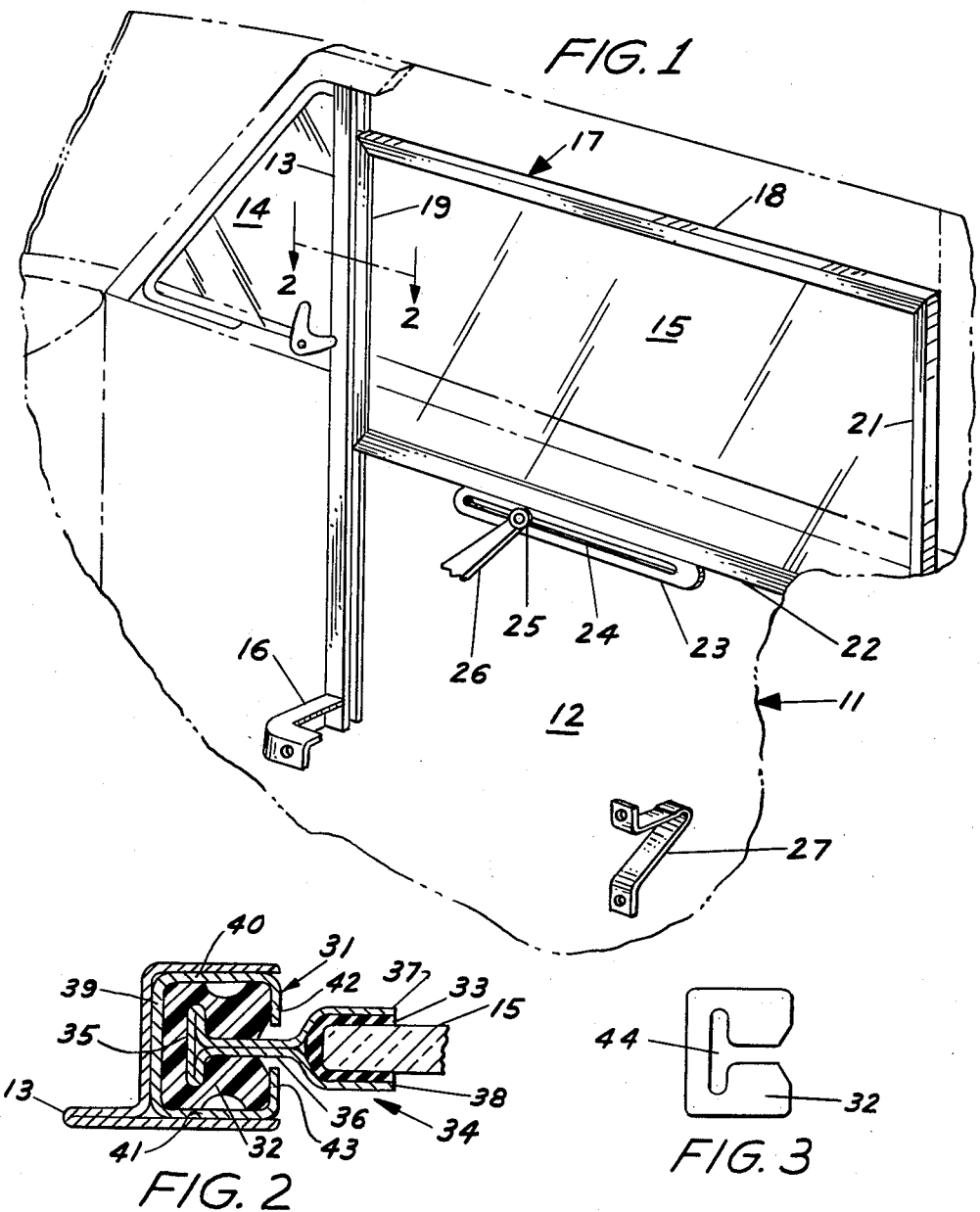
FIGURE 1 is a fragmentary perspective view of an automobile door assembly including the door-vent window division bar or post thereof within which is incorporated one embodiment of the instant invention.
FIGURE 2 is a cross-sectional view taken along line 2—2 of FIGURE 1.
FIGURE 3 is an end view of a glass run liner similar to that shown in FIGURE 2 but isolated to better illustrate the T shaped slot therein.

Referring now to the drawing, there is shown in FIGURE 1 an automobile door 11 having an outer door panel 12, a division post comprising a channel member 13 between ventipane window 14 and a slidable transparent panel or window glass 15. Glass 15 is here shown in an intermediate position between its upper terminal or closed position and its lower terminal or open position. Division post 13 extends downward from the uppermost position of glass 15 into a conventional window well formed between outer door panel 12 and an inner door panel h( removed for purposes of illustrating the window assemb Division post 13 extends downward to just below 1 lowermost position of glass 15 and has a bracket 16 ada ed to secure post 13 to the aforementioned inner pai of door 11. Slidable window glass 15 has a fixedly tached metal frame 17 comprising a top frame member and side frame members 19 and 21 positioned along 1 corresponding edges of the glass and is adapted to lowered into the window well guided by the glass run sembly supported by division post 13 and hereinafter ( scribed in detail in relation to FIGURES 2 and 3. T glass 15 is supported from below by a channel bar which is provided medially of its length with a dependi horizontal retainer 23. The retainer 23 is provided w a slot 24 for slidably receiving a stud 25 secured to t outer end of an actuating arm 26 of a conventional sin; arm window regulator mechanism not further shown. the lower right hand corner of FIGURE 1 there is sho\ a downstop bracket 27 positioned to receive glass 15 in lowermost position and adapted to be secured to the inr panel of door 11.

Referring now to FIGURES 2 and 3, division p( channel member 13 is constructed and arranged to : ceive and retain a glass run channel member genera designated by reference numeral 31 wedgably or otherw fixedly secured in the essentially U shaped channel post 13. Glass run channel member 31 extends insi post 13 from the uppermost position of glass 15 in its t or closed position to just below the lowermost position glass 15 in its down or open position. The channel me: ber 31 is ordinarily, as here, formed of a metal sheet suitable structural strength and rigidity. However, it within the scope of this invention to have channel me: ber 31 formed of a nonmetal providing comparable stri tural characteristics and durability, or, to design the che nel forming portions of post 13 to perform the functic of channel member 31 and thereby eliminate need for t latter. Glass run channel member 31 is of modified shape and has a bottom wall 39 and substantially paral sidewalls 40 and 41. Side walls 40 and 41 each have inwardly directed flange or lip 42 and 43 respective Positioned within channel member 31 is a pliable gl: run liner 32 providing in the form of a substantially shaped slot 44 a slideway for the glass run guide here after discussed. Liner 32 is herein formed from plast using that term in its well-understood broad meaning, a referring to an organic polymeric material which may fibrous in whole or in part, and in particular from a pl: tic that is generally classified as thermoplastic. This pl; tic should be one that is waterproof and weather resista It is preferably tough and stable in form, yet pliable in t sense that it is firmly yielding and resilient with a son what deliberate elastic response. Aside from providi a slideway for a guide affixed to the window, glass lir 32 also has a cushioning or shock absorbing functi being ordinarily interposed between a rigid channel me; ber and a rigid guide member. In one preferred embo ment liner 32 is an extruded polymeric material such graphite impregnated nylon, a polyamide of adipic ac and hexamethylenediamine or modifications thereof a known in the art as nylon or nylon type materials, po: tetrafluoroethylene, or other extrudable material prov: ing both the desired resilience and the requisite low fr tional properties. Liner 32 extends the full length of cha nel member 31 and has a substantially T shaped slot constructed and arranged to receive and retain a cor; spondingly shaped rigid or semi-rigid connecting means glass run guide member 34. In this embodiment glass r guide member 34 is formed of sheet metal although it m be formed of a nonmetal of suitable rigidity and low fr l properties. Guide member 34 has a T shaped
ection consisting of a head member 35 and a leg member
36 constructed and arranged to be slidably mounted
ot 44 of liner 32. At the opposite end of guide member
34 are shank members 37 and 38 which merge into
36 and form a substantially U shaped projection providing
g glass retaining means adapted to straddle the edge
ass 15 and frictionally engage or be otherwise fixedly
red to a seal 33 of rubber or other suitable plastic.
le 34 is in fixed engagement with glass 15 along essentially
the full height of the glass and slidably engaged
glass run channel liner 32 so as to move vertically
ot 44.
oth the resilient liner 32 and the rigid guide member
re preferably inserted within glass run channel member
31 through its open upper end after member 31 has
secured in division post 13 and before this upper end
overed with a fixed or movable cap which forms the
osition stop for glass 15.
us, in accordance with the instant invention glass 15
ided throughout its vertical movements by the glass
assembly comprising the rigid glass run guide slidably
ing within the firmly yieldable liner within the supporting
ing channel member. The coacting retention means
ne assembly represented by lips 42 and 43 of channel
aber 31, the slotted liner 32, and head 35 of guide 34
ent withdrawal of head 35 from slot 44 and channel
a a direction longitudinally of glass 15.

will be understood that the invention is not to be
ed to the exact construction shown and described, but
various changes and modifications may be made
out departing from the spirit and scope of the invention
as defined in the appended claims.

e claim:
A window assembly comprising in combination a
sparent panel reciprocally movable between a first
inal position and a second terminal position; a side
ort at one side of said panel comprising an elongated
nel member having a longitudinal opening extending
t said first terminal position to said second terminal
ion, and connecting means interposed between said
l and support comprising oppositely disposed retention
means and guide means, said retention means securing
said panel to said connecting means; said channel
ber being constructed and arranged to receive, retain
slidably support said guide means; a channel liner
prising a resilient organic polymeric material having
w coefficient of friction in contact with said guide
ns, positioned within said channel member and having
an essentially T shaped longitudinal slot extending between
n said terminal positions and communicating with
longitudinal opening; said guide means comprising an
tially T shaped projection of said connecting means
ding into said channel member and into slidable contact
with said channel liner within said T shaped slot,
channel member, said channel liner, and said guide
as coacting to prevent withdrawal of said guide means
said slot and said channel member in a direction
itudinally of said panel.

A window assembly comprising in combination a
low glass reciprocally movable between an upper terminal
l position and a lower terminal position; a vertically
led side support means along one side of said glass
prising an elongated channel member having a longitudinal
al opening extending from said upper terminal position
to said lower terminal position, connecting means
posed between said panel and side support comprising
glass framing means secured to said glass along substantially
ially the full height of one side thereof and rigid,
itially T shaped guide means extending laterally from
glass frame means; said channel member being constructed
ted and arranged to receive, retain and support said
e means; a channel liner comprising a resilient organic
meric material positioned within said channel member
and having an essentially T shaped longitudinal slot
communicating with said longitudinal opening in said
channel member and extending from said upper terminal
position to said lower terminal position; said T shaped
guide means extending into said channel member and into
slidable engagement with said T shaped slot, said liner
having a low coefficient of friction in contact with said
guide means, said channel member, said channel liner and
said guide means having cooperative retention means
which coact to prevent withdrawal of said guide means
from said slot and said channel member in a direction
longitudinally of said glass.

3. A window assembly comprising in combination a
window glass reciprocally movable between an upper terminal
minal position and a lower terminal position; a vertically
aligned side support means along one side of said glass
comprising an elongated rigid channel member having a
longitudinal opening extending between said terminal positions,
sitions, rigid connecting means interposed between said
panel and said side support comprising retention means
and guide means, said retention means comprising an
essentially U shaped projection of said connecting means
which straddles and is fixedly secured to said glass along
essentially the full height of one side thereof, said channel
member being constructed and arranged to receive, retain
and slidably support said guide means; a channel liner
comprising an extruded, resilient, organic polymeric material
terial positioned within said channel member, said liner
having an essentially T shaped longitudinal slot communicating
cating with said longitudinal opening in said channel member
ber and extending between said terminal position; said
guide means comprising an essentially T shaped projection
tion of said connecting means oppositely disposed in relation
tion to said retention means and extending into said channel
nel member into slidable contact with said channel liner
with said T shaped slot; said channel member and said
T shaped projection coacting to prevent withdrawal of
said guide means from said channel liner and said channel
member in a direction longitudinally of said glass.

4. A window assembly comprising in combination a
window glass reciprocally movable between an upper
terminal position and a lower terminal position; a vertically
tically aligned side support means along one side of said
glass comprising an elongated channel member having a
longitudinal opening extending between said positions,
and connecting means interposed between said panel and
said side support comprising retention means and guide
means, said retention means fixedly secured to said glass
along substantially the full length of one side of said
glass, said channel member being constructed and arranged
ranged to receive, retain and slidably support said guide
means; a channel liner comprising a resilient, organic
polymeric material positioned within said channel member,
ber, said liner being impregnated with lubricating means,
having an essentially T-shaped longitudinal slot communicating
nicating with said longitudinal opening in said channel
member, and extending from said upper terminal position
tion to said lower terminal position; said guide means
comprising an essentially T-shaped projection of said
connecting means extending into said channel member
into slidable contact with said channel liner within said
T-shaped slot, said channel member, said channel liner
and said guide means having cooperative retention means
constructed and arranged to coact to prevent withdrawal
of said guide means from said slot and said channel member
ber in a direction longitudinally of said glass.

5. A window assembly comprising in combination a
window glass reciprocally movable between an upper
terminal position and a lower terminal position; a vertically
tically aligned side support means along one side of said
glass comprising a rigid channel member having a longitudinal
gitudinal opening extending from said upper terminal position
tion to said lower terminal position, and connecting means
interposed between said panel and said side support comprising
prising cushioning means, glass retention means and essentially
sentially T-shaped guide means, said cushioning means forming a substantially U-shaped pliable covering straddling one end of said glass, said glass retention means straddling said cushioning means and firmly holding said cushioning means and said glass, said channel member being constructed and arranged to receive, retain and slidably support said guide means; a channel liner comprising a graphite impregnated nylon extrusion positioned within said channel member, said liner having an essentially T-shaped longitudinal slot communicating with said longitudinal opening in said channel member and extending from said upper terminal position to said lower terminal position; and said guide means extending into said channel member into slidable contact with said channel liner within said slot, said channel member and said guide means having complementary retention means which coact to prevent withdrawal of said guide means from said channel member in a direction longitudinally of said glass.

6. In a motor vehicle body having a door structure mounted thereon, the upper horizontal edge of said door structure defining the lower edge of a window opening in said body, a window glass reciprocally movable through said window opening between an upper position above said window opening and a lower position below said window opening, a side support means mounted on said door structure, positioned along one side of said window glass, and comprising an elongated rigid channel member having a longitudinal opening extending from said upper position to said lower position, connecting means secured to said window glass and including essentially T-shaped guide means; said channel member being constructed and arranged to receive, retain and slidably support said guide means; a channel liner comprising a pliable organic polymeric material positioned within said channel member and having a low coefficient of friction in contact with said guide means, said liner having an essentially T-shaped longitudinal slot in essentially parallel alignment with said longitudinal opening in said channel member and extending between said upper position and said lower position; said T-shaped guide means extending into said channel member and into slidable contact with said channel liner within said T-shaped slot; and a single window regulator arm fixedly secured to the lower part of said window glass for moving said window glass between said upper position and said lower position, said channel member and said guide means coacting to prevent withdrawal of said guide means from said channel member in a direction longitudinally of said glass.

7. In a motor vehicle body having a door structure mounted thereon, the upper horizontal edge of said door structure defining the lower edge of a window opening in said body, a window glass reciprocally movable through said window opening between an upper position above said window opening and a lower position below said window opening, a side support means mounted on said door structure, positioned alongside one side of said window glass and comprising an elongated rigid channel member having a longitudinal opening extending from said upper position to said lower position, and connecting means interposed between said panel and side support means having oppositely disposed retention means and rigid, essentially T-shaped guide means, said retention means fixedly securing said glass to said connecting means, said channel member being constructed and arranged to receive, retain and slidably support said guide means; a channel liner positioned within said channel member and comprising a firmly yieldable, resilient organic polymeric material having a low coefficient of friction in contact with said guide means, said liner having an essentially T-shaped longitudinal slot communicating with said longitudinal opening in said channel member for the full distance between said upper position and said lower position; said guide means extending into said channel member and into slidable contact with said channel liner within said T-shaped slot, said channel member, said channel liner and said guide means coacting to prevent withdrawal of said guide means from said slot and said channel member in a direction longitudinally of said glass and constituting the sole fore and aft support on said door for said glass above said window opening.

References Cited in the file of this patent

UNITED STATES PATENTS

| | | |
|---|---|---|
| 1,981,355 | Hamm | Nov. 20, 1934 |
| 2,365,742 | Brooks | Dec. 26, 1944 |
| 2,405,394 | Austin | Aug. 6, 1946 |
| 2,602,501 | Roos | July 8, 1952 |
| 2,835,539 | Conrad | May 20, 1958 |